US010870479B2

(12) United States Patent
Courtin

(10) Patent No.: US 10,870,479 B2
(45) Date of Patent: Dec. 22, 2020

(54) MULTI-ARCHITECTURE MODULAR UNMANNED AERIAL SYSTEM

(71) Applicant: Aurora Flight Sciences Corporation, Manassas, VA (US)

(72) Inventor: Christopher Courtin, Manassas, VA (US)

(73) Assignee: Aurora Flight Sciences Corporation, Manassas, VA (US)

( * ) Notice: Subject to any disclaimer, the term of this patent is extended or adjusted under 35 U.S.C. 154(b) by 246 days.

(21) Appl. No.: 15/928,355

(22) Filed: Mar. 22, 2018

(65) Prior Publication Data

US 2018/0273158 A1    Sep. 27, 2018

Related U.S. Application Data

(60) Provisional application No. 62/474,721, filed on Mar. 22, 2017.

(51) Int. Cl.
*B64C 1/26* (2006.01)
*B64C 39/02* (2006.01)

(52) U.S. Cl.
CPC .............. *B64C 1/26* (2013.01); *B64C 39/024* (2013.01); *B64C 2201/104* (2013.01);
(Continued)

(58) Field of Classification Search
CPC .... B64C 1/26; B64C 3/38; B64C 3/56; B64C 2201/10; B64C 2201/102;
(Continued)

(56) References Cited

U.S. PATENT DOCUMENTS

| 3,640,492 A | 2/1972 | Star |
|---|---|---|
| 5,941,478 A | 8/1999 | Schmittle |

(Continued)

FOREIGN PATENT DOCUMENTS

| CN | 202728576 | 2/2013 |
|---|---|---|
| EP | 2799335 | 7/2017 |

OTHER PUBLICATIONS

International Search Report; and Written Opinion of the International Searching Authority for International Application No. PCT/US2018/023717 dated Jul. 13, 2018.

*Primary Examiner* — Christopher P Ellis
(74) *Attorney, Agent, or Firm* — Michael Stanley Tomsa; McAndrews, Held & Malloy, Ltd.; Eugene H. Nahm

(57) ABSTRACT

Disclosed herein is a modular aerial vehicle system having a fuselage module configured to couple with a plurality of lift generation modules. The modular aerial vehicle system may comprise a fuselage module and a lift generation module. The fuselage module can include a first attachment interface, an avionics system operatively coupled with a power unit (e.g., via an ESC), and a communications system operatively coupled with the flight controller. The lift generation module can include a second attachment interface and a plurality of propulsors. The fuselage module may be configured to removably couple with the lift generation module via the first and second attachment interfaces. The first and second attachment interfaces may comprise (1) a plurality of electrical contacts to facilitate electrical communication between the fuselage module and the lift generation module and/or (2) one or more retention devices to couple structurally the lift generation module with said fuselage module.

20 Claims, 14 Drawing Sheets

(52) U.S. Cl.
CPC .. *B64C 2201/108* (2013.01); *B64C 2201/126* (2013.01); *B64C 2211/00* (2013.01)

(58) Field of Classification Search
CPC ........ B64C 2201/108; B64C 2201/128; B64D 1/08; B64D 1/10; B64D 1/22
USPC .......................................................... 244/13
See application file for complete search history.

(56) References Cited

U.S. PATENT DOCUMENTS

| | | |
|---|---|---|
| 6,575,406 B2 | 6/2003 | Nelson |
| 6,817,573 B2 | 11/2004 | Harrison et al. |
| 7,234,667 B1 | 6/2007 | Talmage, Jr. |
| 7,699,261 B2 | 4/2010 | Colten et al. |
| 7,922,115 B2 | 4/2011 | Colgren et al. |
| 7,946,530 B1 | 5/2011 | Talmage, Jr. |
| 8,967,526 B2 | 3/2015 | Karem |
| 9,493,226 B2 | 11/2016 | Karem |
| 9,505,484 B1 | 11/2016 | Ai-Sabah |
| 2003/0057325 A1 | 3/2003 | Carroll |
| 2011/0046821 A1 | 2/2011 | Grabowsky et al. |
| 2011/0315806 A1 | 12/2011 | Piasecki et al. |
| 2012/0292435 A1 | 11/2012 | Karem |
| 2014/0231593 A1 | 8/2014 | Karem |
| 2015/0136987 A1 | 5/2015 | Seibel et al. |
| 2016/0244160 A1* | 8/2016 | Colten ................... B64C 39/024 |
| 2017/0036748 A1* | 2/2017 | Plater .................... B64C 39/024 |

* cited by examiner

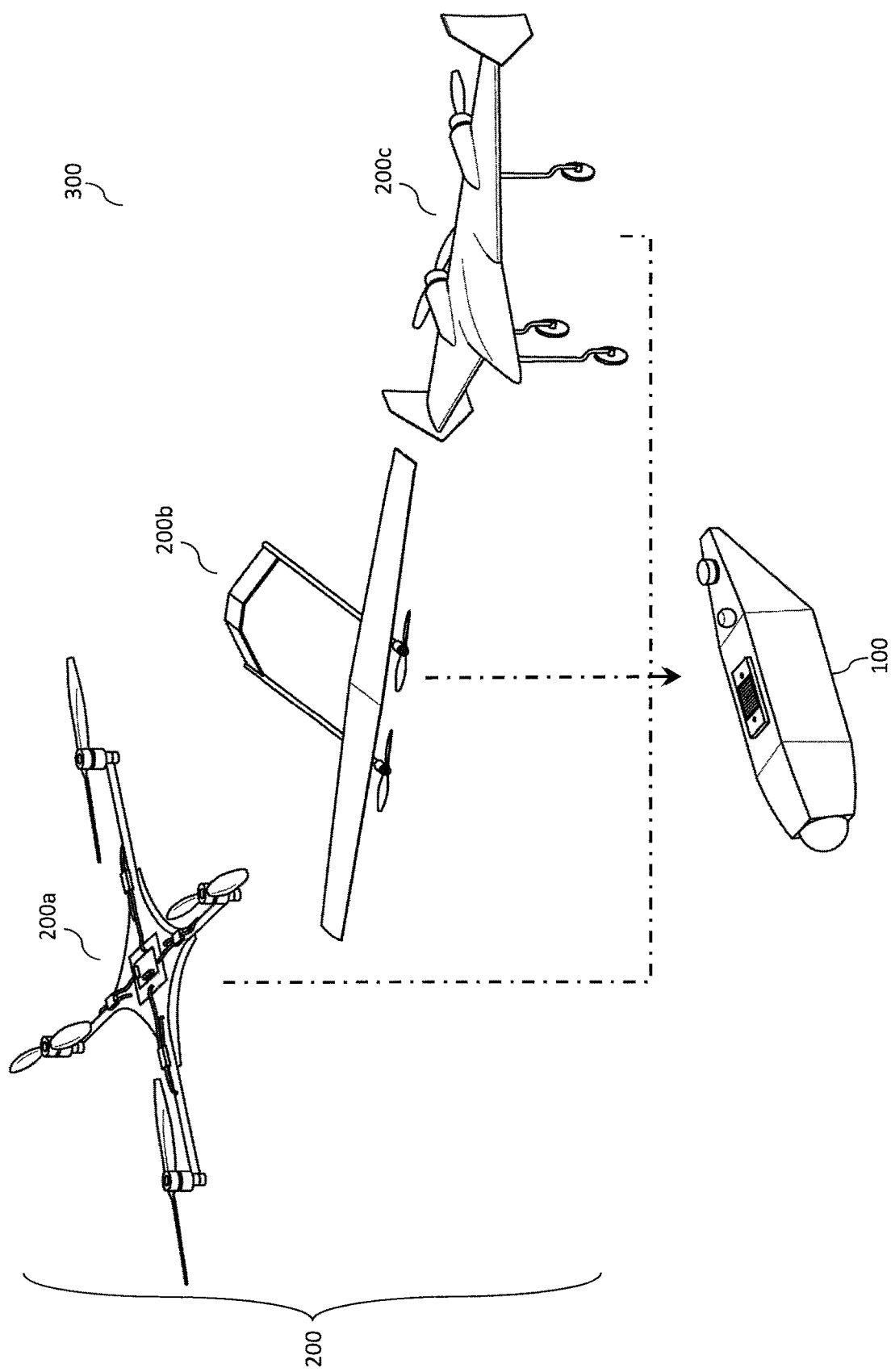

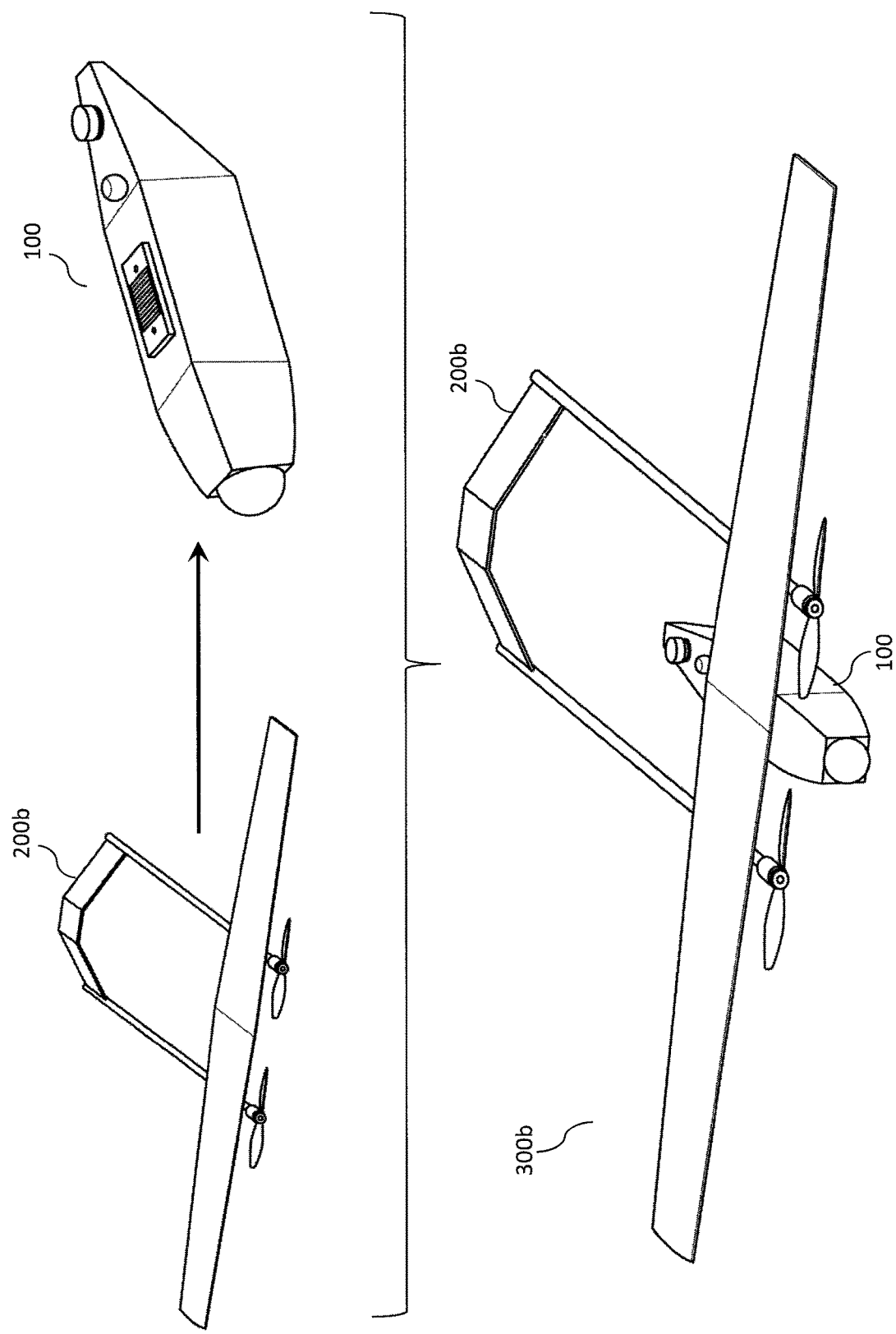

| | Common Fuselage Weights (lbs) | | Hovering Variant Weights (lbs) | | L.E. Variant Weights (lbs) | |
|---|---|---|---|---|---|---|
| Weights | Energy Generation | 14.4 | Common Fuselage | 25.7 | Common Fuselage | 25.7 |
| | Fuse. Structure | 3.3 | Motors | 5.0 | Wing | 6.7 |
| | Avionics/wiring | 1.0 | Props | 1.5 | Vtail | 2.2 |
| | L.G. | 2.0 | ESC | 1.2 | Boom | 2.0 |
| | Payload | 5.0 | Structure | 1.7 | Motors | 2.1 |
| | Total | 25.7 | Total | 35.1 | ESC | 0.8 |
| | | | | | Props | 0.8 |
| | | | | | Total | 40.2 |
| Performance | Endurance, battery only (min) | | 26.2 | | 120.1 | |
| | Endurance, hybrid-electric (min) | | 65.6 | | 320.4 | |

Figure 6

|  | Common Fuselage Weights (lbs) | | Hovering Variant Weights (lbs) | | L.E. Variant Weights (lbs) | | Hi-Speed Weights (lbs) | |
| --- | --- | --- | --- | --- | --- | --- | --- | --- |
| Weights | Energy Generation | 6.1 | Common Fuselage | 14.2 | Common Fuselage | 14.2 | Common Fuselage | 14.2 |
|  | Fuse. Structure | 1.5 | Motors | 2.7 | Wing | 3.0 | Wing | 2.2 |
|  | Avionics/wiring | 0.6 | Structure | 2.0 | V-Tail | 0.2 | V-Tail | 0.0 |
|  | L.G. | 1.0 | ESC | 0.8 | Boom | 1.3 | Boom | 0.0 |
|  | Payload | 5.0 | Props | 1.0 | Motors/ESC | 1.0 | Motors/ESC | 2.0 |
|  | Total | 14.2 | Total | 20.7 | ESC | 0.3 | Total | 18.4 |
|  |  |  |  |  | Props | 0.3 |  |  |
|  |  |  |  |  | Total | 20.2 |  |  |
| Performance | Endurance, battery only (min) | | 19 | | 122.6 | | 40 | |
|  | Range (nmi) | | - | | 80.0 | | 52 | |

MULTI-ARCHITECTURE MODULAR UNMANNED AERIAL SYSTEM

CROSS-REFERENCE

The present application claims the benefit under 35 U.S.C. § 119(e) of U.S. Provisional Patent Application No. 62/474,721, filed Mar. 22, 2017 and titled "Multi-Architecture Modular Unmanned Aerial System," the contents of which are hereby incorporated by reference.

FIELD

The present disclosure relates to the field of aircraft; more particularly, to a modular unmanned aerial system (UAS) with interchangeable lift generation systems and/or modules.

BACKGROUND

The current market for unmanned aerial vehicles (UAVs), such as small unmanned aerial systems (sUAS), encompasses a diverse range of aircraft capabilities through various architecture platforms, including, vertical takeoff, long-endurance, precise landing, hovering capability, etc. There exists, however, a tension between the design variables associated with the different configurations, thereby necessitating different structures for the various aircraft capabilities. For example, an aerial vehicle that is optimized for hovering is structurally different from a fixed-wing aerial vehicle that is optimized for endurance and/or long-range functionality. Moreover, there is currently no shared vehicle control architecture because aerial vehicles employ different command and control systems, video processing interfaces, available payloads, and power generation options depending on the desired aerial vehicle mission capability and architecture platform (e.g., vertical takeoff and landing (VTOL), fixed-wing, long-range, etc.).

Many consumers require the functionality of multiple aircraft architectures, which has resulted in a market filled with different aerial vehicles with architecture platforms point-optimized for a single mission or severely compromised by attempting to provide the ability to perform multiple missions. For customers who need to exploit many different aerial vehicle mission capabilities, the consumer is faced with a logistical problem of having to operate several different types of aerial vehicle architecture platforms, each of which being embodied as a standalone system. This adds considerable cost because existing aerial vehicle components are generally not interchangeable. Command and control systems, for example, cannot be run via a common operator console and data is accessed through different formats or interfaces.

Additionally, payloads are not generally transferable between aerial vehicles of different architecture platforms, even when they generally perform similar functions. For example, suppose a disaster response crew wishes to use a sophisticated camera system for first mapping of a large area and then perform a close-up inspection of particular regions of interest. In the current paradigm, the disaster response crew would need to either purchase two camera systems, one for a fixed-wing mapping aerial vehicle and one for a hovering multicopter (i.e., a VTOL) aerial vehicle, or perform the mapping inefficiently using only a hovering multicopter aerial vehicle, which results in an inefficient use of scarce time and monetary resources.

In view of the foregoing, a need exists for a modular UAS with interchangeable lift generation systems. As will be discussed, the modular UAS can be built around a common vehicle core, to which multiple different lift generation systems can be attached. This common vehicle core can contain a modular payload, a power unit, a communication system, and a flight controller.

SUMMARY

The present invention is directed to a modular UAS with interchangeable lift generation systems.

According to a first aspect, an aerial vehicle fuselage comprises: a flight controller operatively coupled with a power unit; and a communications system operatively coupled with the flight controller, wherein the aerial vehicle fuselage is configured to removably couple with one of a plurality of lift generation modules at an attachment point of the aerial vehicle fuselage via an attachment interface, and wherein a plurality of electrical contacts are located at the attachment point to facilitate electrical communication between the flight controller and the one of a plurality of lift generation modules.

According to a second aspect, an aerial vehicle system comprises: a fuselage module comprising a first attachment interface, a flight controller operatively coupled with a power unit, and a communications system operatively coupled with the flight controller; and a lift generation module comprising a second attachment interface and a plurality of propulsors, wherein the fuselage module is configured to removably couple with the lift generation module via the first and second attachment interfaces, and wherein the first and second attachment interfaces comprise (1) a plurality of electrical contacts to facilitate electrical communication between the fuselage module and the lift generation module and (2) one or more retention devices to couple structurally the lift generation module with said fuselage module.

According to a third aspect, a method for improving an operational capability of an aerial vehicle system comprises: providing a fuselage module comprising a first attachment interface, a flight controller operatively coupled with a power unit, and a communications system operatively coupled with the flight controller; and providing a lift generation module comprising a second attachment interface and a plurality of propulsors, wherein the fuselage module is configured to removably couple with the lift generation module via the first and second attachment interfaces, and wherein the first and second attachment interfaces comprise (1) a plurality of electrical contacts to facilitate electrical communication between the fuselage module and the lift generation module and (2) one or more retention devices to couple structurally the lift generation module with said second attachment interface.

According to a fourth aspect, an aerial vehicle system comprises: a plurality of lift generation modules, wherein the plurality of lift generation modules includes a multirotor vertical takeoff and landing (VTOL) lift generation module and a fixed-wing lift generation module; and a fuselage module having a power unit, a flight controller, and a communications system, wherein the fuselage module is configured to interface selectively with one of said plurality of lift generation modules.

In certain aspects, the flight controller operatively coupled with the power unit via an electronic speed controller (ESC).

In certain aspects, the power unit, the flight controller, and the communications system are positioned in an airframe to define a fuselage module, wherein the attachment interface is coupled to the airframe and is configured to couple structurally with a second attachment interface of the one of a plurality of lift generation modules via one or more retention devices.

In certain aspects, the one or more retention devices includes a magnetic connector.

In certain aspects, said plurality of lift generation modules includes a multirotor vertical takeoff and landing (VTOL) lift generation module and a fixed-wing lift generation module.

In certain aspects, the fixed-wing lift generation module is a long-endurance lift generation module or a high-speed lift generation module.

In certain aspects, the lift generation module is a fixed-wing lift generation module comprising at least one fixed wing.

In certain aspects, at least one of the plurality of propulsors is coupled to the at least one fixed wing.

In certain aspects, the lift generation module comprises a support frame with a plurality of longitudinal booms extending radially from the support frame.

In certain aspects, each of said plurality of propulsors is positioned at a distal end of one of said plurality of longitudinal booms and oriented to direct thrust downward.

In certain aspects, the flight controller is configured to couple electrically said power unit to said one of said plurality of lift generation modules via one or more of the plurality of electrical contacts.

In certain aspects, at least one of the flight controller or the communications system is configured to communicate data with said one of said plurality of lift generation modules via one or more of the plurality of electrical contacts.

In certain aspects, the power unit is a hybrid-electric system configured to generate electricity via an engine-driven generator.

In certain aspects, the power unit is a rechargeable battery.

In certain aspects, each of said plurality of propulsors is operatively coupled to an electronic speed controller (ESC) configured to control propulsor speed. The ESC may be located in or on either the fuselage module or the lift generation module(s). Therefore, the flight controller operatively coupled with the power unit directly or via an ESC.

In certain aspects, the flight controller is configured to couple electrically said power unit to the lift generation module via one or more of the plurality of electrical contacts.

In certain aspects, at least one of the flight controller or the communications system is configured to communicate data with the lift generation module via one or more of the plurality of electrical contacts.

In certain aspects, the fuselage module is configured to authenticate the lift generation module to ensure compatibility or interoperability with the fuselage module.

In certain aspects, the fuselage module is configured to authenticate the one of the plurality of lift generation modules using radio-frequency identification (RFID).

In certain aspects, the fuselage module comprises an RFID reader and the lift generation module comprises an RFID tag.

In certain aspects, the fuselage module processes information from the RFID tag in determining whether or not to authenticate the lift generation module.

In certain aspects, the information comprises at least one of maintenance status (e.g., service needed, service complete, service date), manufacturer, or type of lift generation module (e.g., fixed-wing, VTOL, propulsor configuration, number of propulsors, etc.).

In certain aspects, the fuselage module is configured to interface selectively with one of said plurality of lift generation modules via an attachment interface having (1) a plurality of electrical contacts, and (2) one or more retention devices to couple structurally the fuselage module with said one of said plurality of lift generation modules.

In certain aspects, the fuselage module comprises an airframe and a modular payload that is removable coupled with the airframe.

In certain aspects, the modular payload comprises an intelligence, surveillance, and reconnaissance (ISR) payload.

In certain aspects, the modular payload is removably coupled to the airframe via one or more retention devices.

In certain aspects, the one or more retention devices includes a magnetic connector.

In certain aspects, the power unit is positioned at or near the fuselage module's center of gravity.

In certain aspects, the fuselage module is configured to transfer power to the lift generation module via a wireless power transmission technique

DESCRIPTION OF THE DRAWINGS

These and other advantages of the present disclosure will be readily understood with the reference to the following specifications and attached drawings wherein:

FIG. 1e illustrates an example aerial vehicle system having a fuselage module and three different interchangeable lift generation modules.

FIG. 3b illustrates an aircraft in a long-endurance configuration.

FIG. 6 is a chart illustrating the performance estimates for a first propulsion aerial vehicle system and payload.

FIG. 7 is a chart illustrating the performance estimates for a second propulsion aerial vehicle system and payload.

DETAILED DESCRIPTION

Figure 1A:
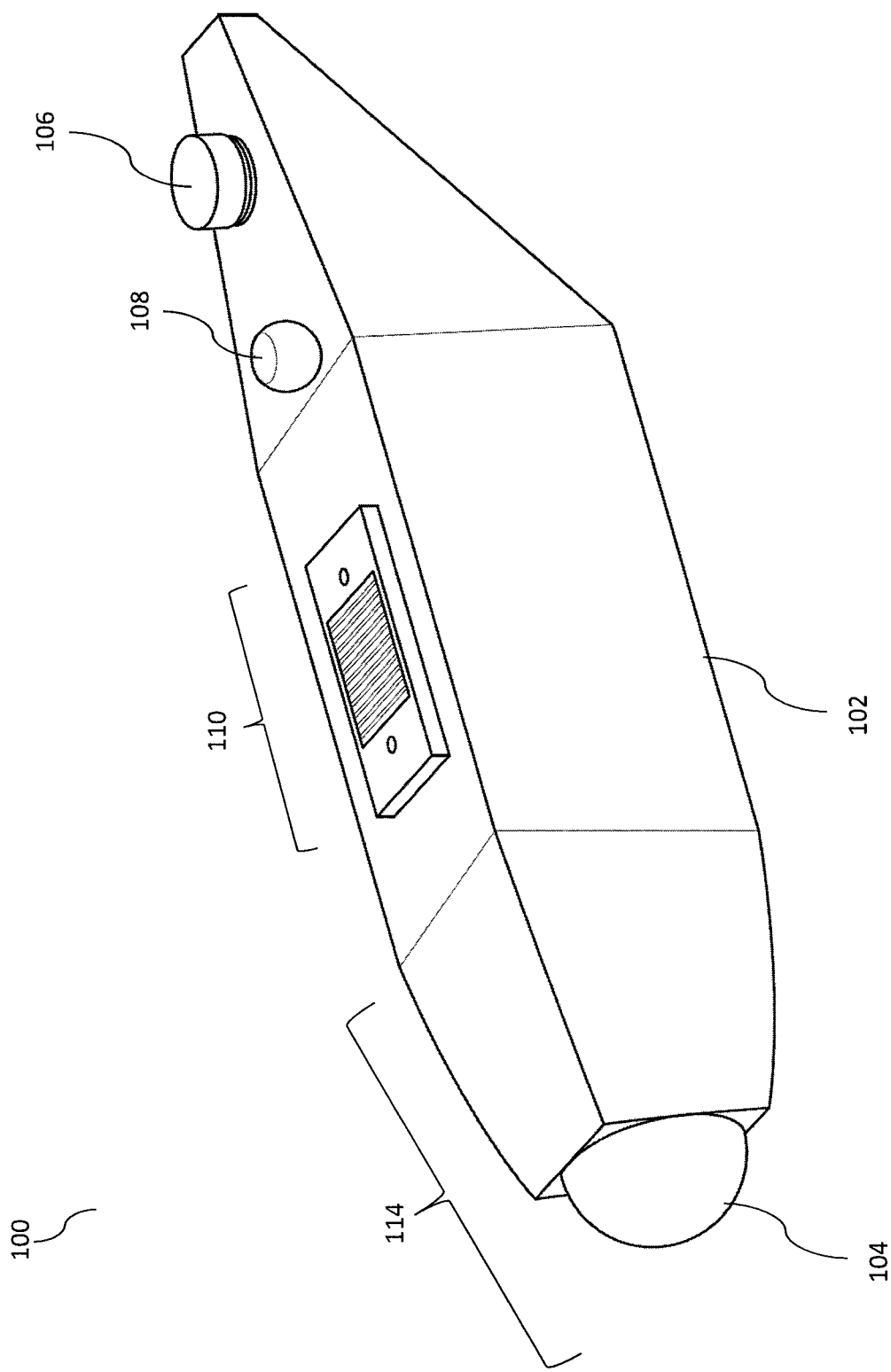
FIGS. 1a through 1c illustrate an example fuselage module.

Preferred embodiments of the present disclosure will be described hereinbelow with reference to the accompanying drawings. In the following description, well-known functions or constructions are not described in detail because they may obscure the disclosure in unnecessary detail. For this disclosure, the following terms and definitions shall apply.

The terms "about" and "approximately," when used to modify or describe a value (or range of values), mean reasonably close to that value or range of values. Thus, the embodiments described herein are not limited to only the recited values and ranges of values, but rather should include reasonably workable deviations. The terms horizontal and vertical, as used herein, are used to describe angles or planes relative to the ground, such as when the aircraft is on the ground.

The terms "aerial vehicle" and "aircraft" each refer to a machine capable of flight, including, but not limited to, fixed-wing aircraft, unmanned aerial vehicle, variable wing aircraft, and vertical take-off and landing (VTOL) aircraft. VTOL aircraft may include fixed-wing aircraft (e.g., Harrier jets), rotorcraft (e.g., helicopters), tilt-rotor/tilt-wing aircraft, and/or the new category of aircraft, as disclosed herein.

The term "and/or" means any one or more of the items in the list joined by "and/or". As an example, "x and/or y" means any element of the three-element set {(x), (y), (x, y)}. In other words, "x and/or y" means "one or both of x and y". As another example, "x, y, and/or z" means any element of the seven-element set {(x), (y), (z), (x, y), (x, z), (y, z), (x, y, z)}. In other words, "x, y, and/or z" means "one or more of x, y, and z."

The terms "circuits" and "circuitry" refer to physical electronic components (e.g., hardware) and any software and/or firmware ("code") which may configure the hardware, be executed by the hardware, and or otherwise be associated with the hardware. As used herein, for example, a particular processor and memory may comprise a first "circuit" when executing a first set of one or more lines of code and may comprise a second "circuit" when executing a second set of one or more lines of code. As utilized herein, circuitry is "operable" to perform a function whenever the circuitry comprises the necessary hardware and code (if any is necessary) to perform the function, regardless of whether performance of the function is disabled, or not enabled (e.g., by a user-configurable setting, factory trim, etc.).

The terms "communicate" and "communicating" refer to (1) transmitting, or otherwise conveying, data from a source to a destination, and/or (2) delivering data to a communications medium, system, channel, network, device, wire, cable, fiber, circuit, and/or link to be conveyed to a destination.

The term "composite material" as used herein, refers to a material comprising an additive material and a matrix material. For example, a composite material may comprise a fibrous additive material (e.g., fiberglass, glass fiber ("GF"), carbon fiber ("CF"), aramid/para aramid synthetic fibers, etc.) and a matrix material (e.g., epoxies, polyimides, and alumina, including, without limitation, thermoplastic, polyester resin, polycarbonate thermoplastic, casting resin, polymer resin, acrylic, chemical resin). In certain aspects, the composite material may employ a metal, such as aluminum and titanium, to produce fiber metal laminate (FML) and glass laminate aluminum reinforced epoxy (GLARE). Further, composite materials may include hybrid composite materials, which are achieved via the addition of some complementary materials (e.g., two or more fiber materials) to the basic fiber/epoxy matrix.

The term "database" as used herein means an organized body of related data, regardless of the manner in which the data or the organized body thereof is represented. For example, the organized body of related data may be in the form of one or more of a table, a map, a grid, a packet, a datagram, a frame, a file, an e-mail, a message, a document, a report, a list, or data presented in any other form.

The term "exemplary" means serving as a non-limiting example, instance, or illustration. As utilized herein, the terms "e.g." and "for example" set off lists of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled or not enabled (e.g., by an operator-configurable setting, factory trim, etc.).

The more expensive and difficult-to-develop aerial vehicle systems (e.g., payload, communications, power generation, and flight control hardware) are generally reusable across various different types of aerial vehicles platforms. The components that provide major differentiation in flight capability and lift generation (e.g., wings, flight surfaces, motors, landing gear) are relatively low-cost, but are not generally reusable across different platforms. Accordingly, disclosed herein is a modular UAS that can be built around a common vehicle core (e.g., as a fuselage module), to which multiple different lift generation systems (e.g., as lift generation modules) can be attached. For example, the fuselage module may contain, inter alia, a modular payload (e.g., an ISR payload), a power unit, a communication system, and a flight control system, while each lift generation module contains the components that provide major differentiation in flight capability. As can be appreciated, to provide lower cost to the consumer, the fuselage module can be designed to contain within its airframe the more expensive and difficult to develop systems, while the interchangeable lift generation modules include the lower cost, operation specific hardware.

A modular UAS offers many advantages. First, a modular UAS enables lower costs to the consumer because a single fuselage module can be used to accomplish several different missions that would otherwise necessitate the purchase of multiple independent aerial vehicles. Second, for consumers operating large fleets of UAS, a modular UAS offers the ability to operate aerial vehicles with many different capabilities/modalities (e.g., hovering, fixed-wing, hybrid) within a common command and control framework. In addition, a modular UAS also allows the ability to tailor the vehicle capabilities to the specific mission, without the compromises traditionally necessary in trying to develop an aerial vehicle that offers multiple mission capabilities (e.g., existing VTOL fixed-wing aircraft, such as tilt-rotors). The modular UAS thereby enables the re-use of payloads across broad mission ranges, and enables an integrated command and control architecture for aerial vehicles with disparate capabilities.

Figure 1B:
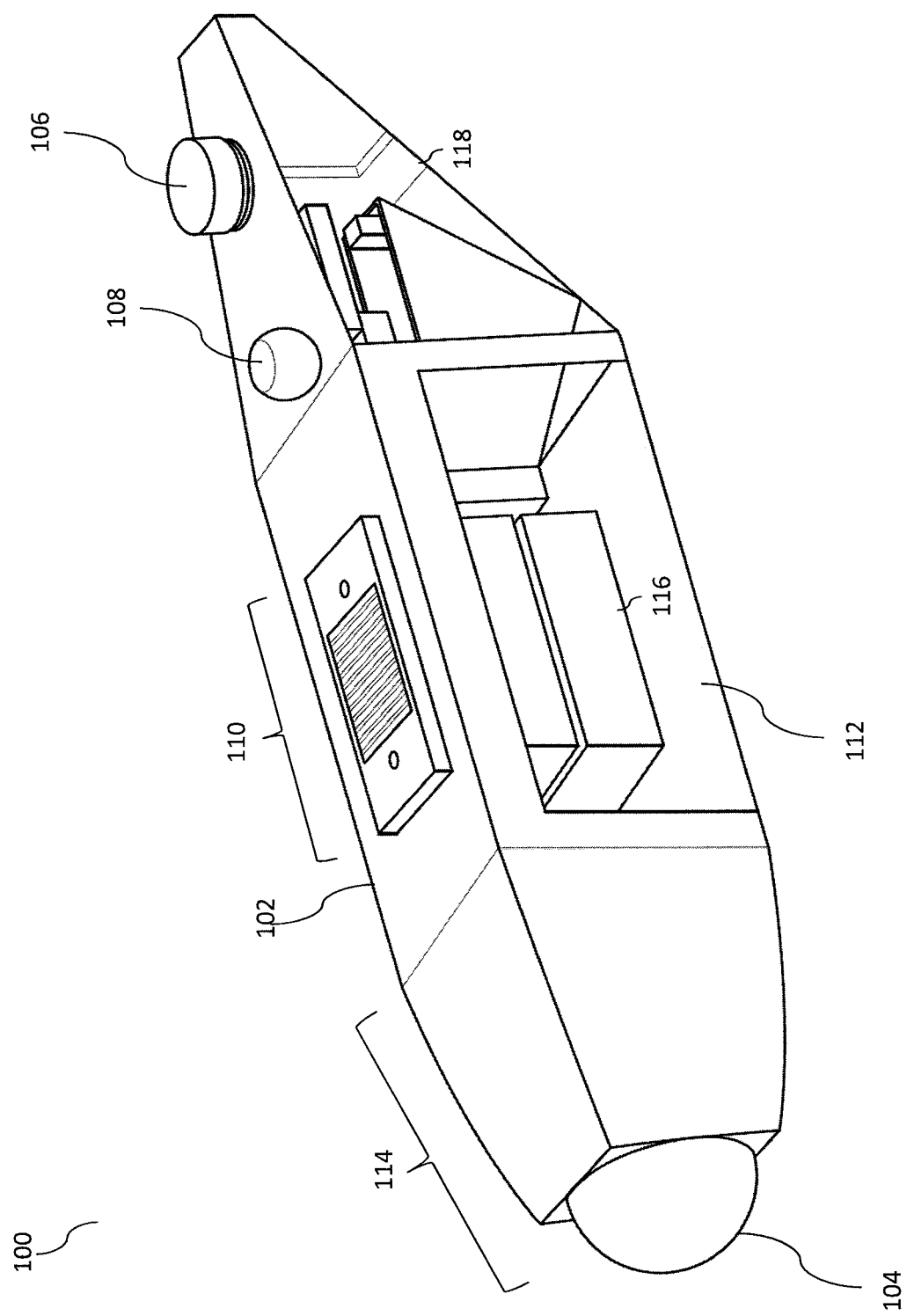
Figure 1C:
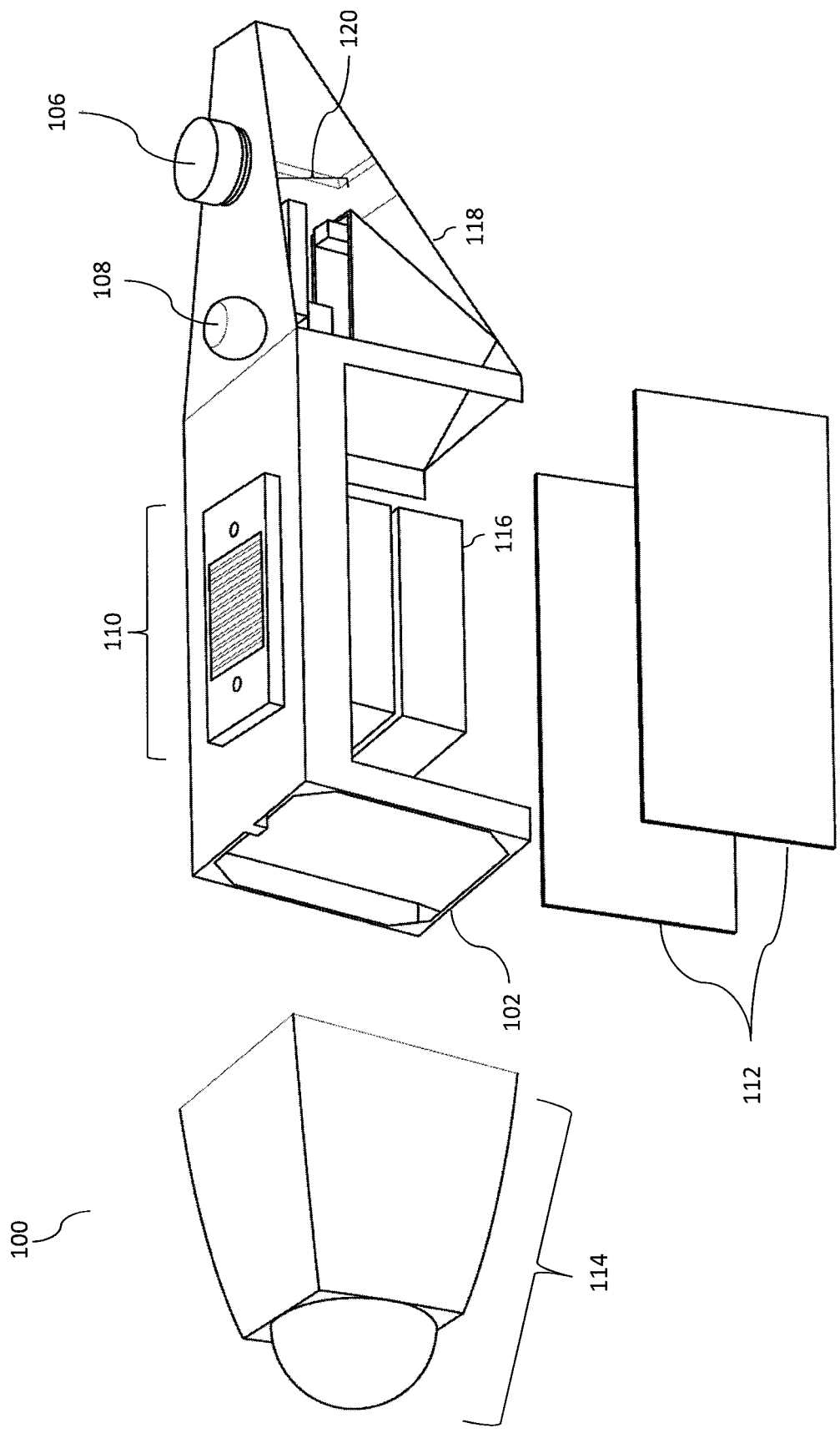

With reference to the figures, FIG. 1*a* illustrates a perspective view of an example fuselage module 100, which can serve as the common vehicle core. FIG. 1*b* illustrates the fuselage module 100 with its fuselage access panels 112 and the access panels of the avionics payload bay 118 illustrated as translucent to better show internal components, while FIG. 1*c* illustrates the fuselage module 100 with the modular payload 114 detached from the airframe 102 and fuselage access panels 112 removed. As illustrated, the fuselage module 100 generally comprises an airframe 102, a GPS antenna 106, an antenna 108 (e.g., a GPS or communication antenna), an attachment interface 110, and a modular payload 114, which may include, for example, a payload camera 104 or other sensors. The GPS antenna 106 and the antenna 108 are operatively connected to the fuselage module's 100 avionics and communications systems 120, which may be contained within an avionics payload bay 118. As will be described in connection with FIG. 5, the avionics and communications systems 120 may comprise, for example, a flight controller 514, a communication system 508, a navigation system 520 (e.g., a GPS system 520*a*), etc. The avionics payload bay 118 may further house any additional desired avionics systems.

Figure 2A:
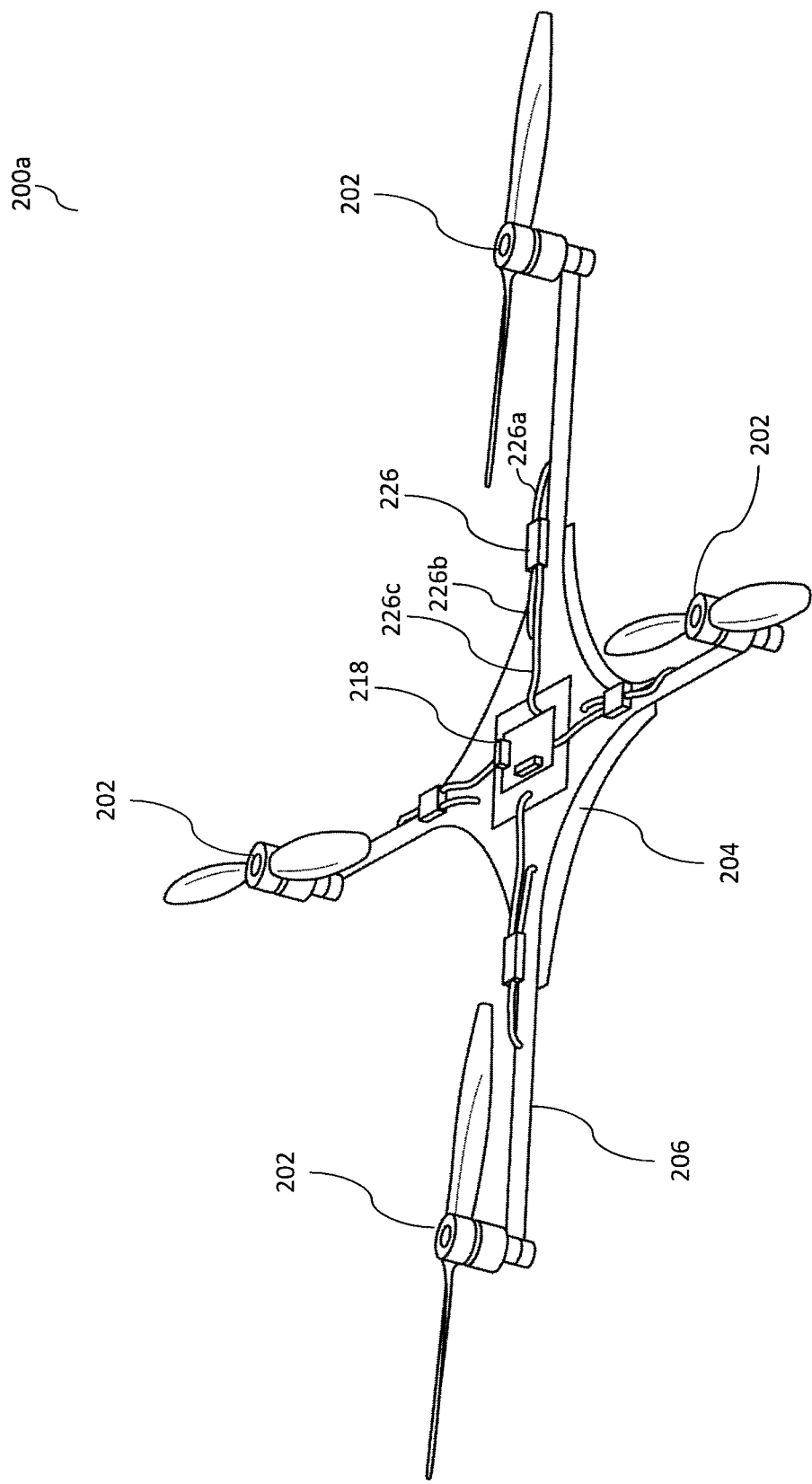
FIG. 2a illustrates a perspective view of a multirotor VTOL lift generation module.

Depending on the capabilities desired for a given mission, the fuselage module 100 may be used with several different lift generation modules 200. Three example lift generation modules 200*a*, 200*b*, 200*c* are shown in FIG. 2*a* (a multi-rotor VTOL lift generation module 200*a*), 3*a* (a long-endurance lift generation module 200*b*), and 4*a* (a high-speed lift generation module 200*c*). Additional combinations of functionality are enabled through the modular payload 114 that can be removable coupled to the aerial vehicle (e.g., via the airframe 102 of the fuselage module 100).

Power Unit 116.

The power unit 116 generates (or provides) the power required to operate the component of the lift generation module(s) 200, avionics and communications systems 120 (e.g., its flight controller and communications system), payload (e.g., modular payload 114), and any other aerial vehicle systems. Power from the power unit 116 can be distributed electrically from the power unit 116, through the attachment interface 110 (using one or more electrical contacts, such as Pogo Pins/pads, and/or a wire connector connection, discussed below), and to the power conditioning electronics in the lift generation module 200 or other payloads. The power conditioning electronics may regulate and clean power from the power unit 116 by implementing dynamic power adjustments and removing spikes, surges, noise, sags, and frequency irregularities, which may damage or otherwise adversely affect the performance of the lift generation module 200 or other payloads.

As illustrated, a power unit 116 may be positioned at the center of the fuselage module 100. The power unit 116 may generate its own power, or be charged through a charge port/connector on the fuselage module 100 (e.g., under the control of a processor). Charging and discharging of the power unit 116 (e.g., its batteries) may be controlled by the fuselage module's 100 flight controller 514 (e.g., an aircraft processor 502 and/or control circuitry 504). The power unit 116, depending on the propulsor type, may be a primary or rechargeable battery (e.g., lithium ion batteries, lead-acid batteries, nickel-metal hydride batteries, nickel-cadmium) or a fuel tank (e.g., to hold wet fuel). A propulsor refers to a mechanical device that gives propulsion and/or thrust to the aircraft including, without limitation, a motor/engine-driven propellers, jet or turbine engines, vectoring motor pods, etc. For example, when the fuselage module 100 is designed to operate in an all-electric system with lift generation modules 200 having electric motors to drive its propulsors, the power unit 116 may be a battery. Conversely, the power unit 116 may be a fuel tank (optionally with fuel pumps) if the lift generation modules 200 use an engine (e.g., a wet fuel engine). In another aspect, the power unit 116 may be a hybrid-electric system (e.g., employing an engine-driven generator), in which case the power unit 116 may include a battery, a fuel tank, an engine, and a generator. In operation, the engine burns the fuel stored to the fuel tank to drive the generator, which in turn produces electricity to power the propulsors. Depending on the aerial vehicle operation, a hybrid-electric system can offer substantial advantages, but, as can be appreciated, hybrid-electric systems result in additional cost and logistical complexity. For example, hybrid-electric systems provide roughly two to three times the flight time as compared to an aerial vehicle with all-electric battery system of a comparable weight and size (e.g., aerial vehicles under 50 pounds).

Given the relatively high density of the power unit 116, the power unit 116 may be positioned at, or near, the center of gravity of the fuselage module 100 to maintain balance in the aerial vehicle during flight/use across platforms. The center of gravity of the fuselage module 100 may be determined using known techniques (e.g., using computer-aided design (CAD) software or using known mathematical equations). As can be appreciated by those of ordinary skill in the art, the term center of gravity generally refers to a point at which, if the fuselage module 100 were suspended, it would be balanced in all positions—i.e., fuselage module's 100 hypothetical balancing point in all directions.

Attachment Interface 110.

Figure 1D:
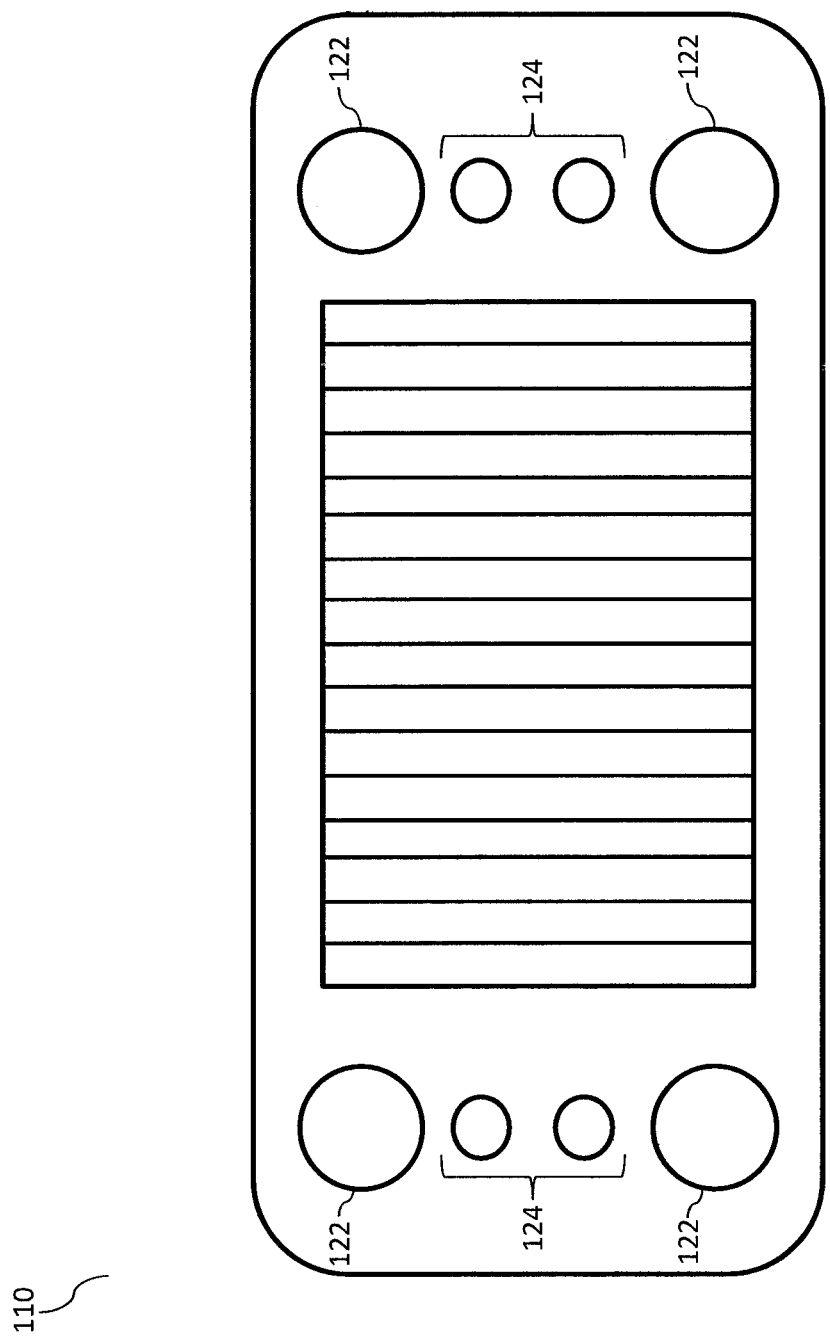
FIG. 1d illustrates an example attachment interface for the fuselage module.

FIG. 1*d* illustrates a top plan view of an example attachment interface 110. The attachment interface 110, which may be sized and shaped as an attachment plate with electrical and mechanical connection/interfaces, provides a connection point between an attachment point of the fuselage module 100 and an attachment point of the lift generation module 200. To that end, each lift generation module 200 also includes an attachment interface (e.g., a corresponding attachment interface, plate, or other mechanism) sized and shaped to couple to the attachment interface 110 of the fuselage module 100. The attachment interface 110 can function as a structural element to join the fuselage module 100 to the lift generation module(s) 200. In one example, the attachment interface 110 may serve as a male connector, while the corresponding attachment interface on the lift generation module 200 may serve as a female connector (or vice versa).

The attachment interface 110 can also be used as an electrical connection point, as an electrical connector, or electrical connection may be made as a standalone connector. To enable electrical interface functionality, the attachment interface 110 may comprise one or more electrical contacts, such as contact pads and/or electrical contact pins (e.g., spring loaded contact pins, also known as Pogo Pins—described below). The attachment interface 110 enables transmission of data (e.g., transmit flight control commands) and/or power between the fuselage module 100 (e.g., the flight controller, power unit, and/or other onboard systems) and the lift generation module 200 (e.g., propulsors, actuators, and/or other onboard systems) via the corresponding attachment interface positioned on the lift generation module 200.

The attachment interface 110 may further include one or more retention devices 122 to couple structurally the lift generation module 200 to the fuselage module 100 via the attachment interface 110. Alternatively, such retention devices 122 may be positioned elsewhere on the fuselage module 100, such as the airframe 102.

Data Transmission.

Flight control commands and/or power may be transmitted between the fuselage module 100 and the lift generation module 200 using one or more physical electrical contacts/connectors 124 (e.g., electrical contacts, electrical wires and plugs, etc.). The electrical contacts/connectors 124 may be used to transmit flight control commands and/or power from the fuselage module 100 (e.g., the flight controller) to a lift generation module 200, as well as exchanging any required data between the lift generation module 200 and the flight control system of the fuselage module 100.

For example, a plurality of electrical contact pins may reside on the attachment interface 110 and be configured to electrically couple with one or more electric contact pads on the lift generation module 200 (e.g., via a corresponding attachment interface at an attachment point). The electrical contact pins may be spring loaded to allow for movement while maintaining an electrical connection between the fuselage module 100 and the lift generation module 200. However, the spring-loaded pins may instead be located on the lift generation module 200 side, or a combination thereof. The stroking movement of the spring pin piston accommodates uneven non-parallel conditions due to mechanical tolerances in the assembly and during flight. Suitable spring loaded pins include Mill-Max Spring-Loaded ("Pogo Pin") Contacts. Mill-Max Spring Loaded Contacts are button type contacts interconnecting two parallel conductive surfaces inside an electronic device or instrument (e.g., between the fuselage module 100 and the lift generation module 200). The Pogo Pins and contact pads may be constructed from non-corrosive and/or corrosion-resistant alloys, such as gold-plated brass alloy components and a gold-plated spring.

In certain aspects, data transmission may be accomplished between the fuselage module 100 and the lift generation module 200 using 8 to 12 direct servo channels, as well as network cable (e.g., Ethernet, ribbon cable, optical fiber cable, twisted pair cables, etc.), a serial peripheral interface bus (SPI) (a synchronous serial communication interface specification used for short distance communication), and/or an inter-integrated circuit ($I^2C$). In another aspect, a wireless transceiver may be employed to communicate data between the fuselage module 100 and the lift generation module 200. The wireless transceiver may be a wireless transceiver configured to communicate via one or more wireless standards such as radio-frequency identification (RFID), Near Field Communication (NFC), Bluetooth (e.g., short-wavelength, UHF radio waves in the ISM band from 2.4 to 2.485 GHz), Wi-Fi (e.g., IEEE 802.11 standards), etc.

In certain aspects, the fuselage module 100 may be configured to perform an authentication step to authenticate/validate the lift generation module 200 to ensure compatibility and/or interoperability with the fuselage module 100. For example, the fuselage module 100 may request information from the lift generation module 200 relating to the lift generation module's 200 type, operation requirements, manufacturer, age, service history, etc. In certain aspects, the fuselage module 100 may authenticate the lift generation module 200 using RFID or another communication standard, such as NFC. For example, an RFID tag (e.g., a passive RFID tag, although active RFID tags are contemplated as well) may be positioned on the lift generation module 200, which may be read by a RFID reader on the fuselage module 100. Based at least in part on the information/data received from the lift generation module 200, the fuselage module's 100 flight controller may adjust (or prohibit) its operation. For example, if the fuselage module's 100 flight controller determines (e.g., via aircraft processor 502) that the lift generation module 200 is a multirotor VTOL lift generation module 200a (e.g., based on data received from the lift generation module 200), the flight controller may employ a predetermined flight operation plan specific to, or designed for, multirotor operation, which may differ from flight operation plans employed, for example, with fixed-wing lift generation modules, such as long-endurance lift generation modules 200b, high-speed lift generation modules 200c, etc.

In the event the lift generation module 200 is determined by the fuselage module 100 (e.g., via an internal processor, such as the aircraft processor 502, which may be integral with the flight controller) to be non-compliant (e.g., requires maintenance, non-compatible manufacturer, model or serial number, malfunctioning, unsupported lift generation module type, etc.), the fuselage module's 100 flight controller may notify the operator using an onboard display (e.g., LED/LCD display positioned on the fuselage module 100), through an audible sound (e.g., an alarm/beep/series of beeps), or through wireless communication with a remote user terminal (e.g. computer, smart phone, tablet computer, etc.). For example, the maintenance status may indicate that service is needed, that service is complete, last service date, upcoming service date, etc.

Power Transmission.

The physical electrical contacts/connectors 124 may be further used to transfer power between the fuselage module 100 and the lift generation module 200. While power would traditionally transfer from the fuselage module's 100 power unit 116 to the lift generation module 200, the reverse may occur if the lift generation module 200 includes one or more power generators. Example power generators include solar cells/arrays, which may be arranged/installed on the surfaces (e.g., wings, airframe, or other generally flat surface) of the lift generation module 200.

In other aspects, wireless power transmission may be used to transfer power between the fuselage module 100 and the lift generation module 200. For example, a wireless power transmitter may be positioned on the fuselage module 100 to transfer power to a wireless power receiver positioned on the lift generation module 200. Example wireless power transmission techniques include inductive power transfer (e.g., magnetic resonance and magnetic induction), resonant inductive coupling, etc. Suitable wireless power transfer protocols include, for example, Qi, A4WP, etc.

Retention Devices 122.

The lift generation modules 200 and the modular payload 114 may be removably coupled and configured for easy installation on and/or removal from the airframe 102 to facilitate stowage or to permit use of other lift generation modules 200 (e.g., replacement or mission-specific). To that end, the airframe 102 may be provided with one or more retention devices (e.g., mechanical retention devices) to retain passively the modular payload 114 and/or the lift generation module 200 to the aircraft (e.g., airframe 102). To avoid a reduction in aircraft performance, the retention devices are preferable light in weight and high in strength.

The retention devices can take the form of snap locks, clips, screws/bolts, magnetic connectors, brackets, screw-threaded mounts, a bayonet-type mounts, breech-lock (friction lock) mounts, hook-and-loop fasteners (e.g., Velcro®) or a combination thereof. Suitable magnets include high-strength neodymium magnets. Neodymium magnets are permanent magnets made from an alloy of neodymium, iron, and boron to form the $Nd_2Fe_{14}B$ tetragonal crystalline structure. Another suitable magnet type includes electromagnets, which may be selectively activated or deactivated by the fuselage module 100 (e.g., by turning on or off the current supply to the magnet from the power unit 116), which may be controlled by an onboard processor, such as the aircraft processor 502.

The attachment interface 110 can provide the mechanical connection between the fuselage module 100 and the lift generation module 200 using one or more retention devices 122. When Pogo Pins are employed for data/power transmission, the retention devices 122 also serve to ensure electrical contact by pressing the Pogo Pins of the attachment interface 110 against their corresponding contact plates on the lift generation module's 200 attachment interface. In certain aspects, the fuselage module 100 may slideably engage with the lift generation module 200 via the one or more retention devices 122. A slideable retention device 122, for example, allows for adjustment of the attachment interface, thereby enabling the operator to select the location at which the lift generation module 200 is positioned on the fuselage module 100, which enables on the fly design adjustments, including adjustment of pitching moment, COG adjustment, etc. For example, the fuselage module 100 may be slideably coupled with the lift generation module 200 using, for example, a combination of rails and ball bearings. In another aspect, one or both attachment interfaces (whether on the fuselage module 100 or the lift generation module 200 side) may include a plurality of distributed retention devices 122. For example, the attachment interface 110 may include retention devices 122 distributed along the length of the fuselage module 100 to provide the operator with options when selecting a location (e.g., attachment point) for the attachment interface.

In certain aspects, the retention devices are sufficiently strong to secure the lift generation modules 200 and the modular payload 114 in place during operation, but capable of giving way (e.g., detaching) upon sudden impact (e.g., ground impact, in-air impact, or any other unexpected impact or collision) or intentional disassembly by the operator. Accordingly, during impact, the lift generation modules 200 and the modular payload 114 may eject away from the airframe 102. Without ejecting, a significant portion of the entire vehicle's landing loads would have to travel through the modular payload 114 (and possibly the lift generation module 200), resulting in undesirable damage to the modular payload 114. As such, ejection protects the mechanical components of the lift generation modules 200 and/or the modular payload 114 from damage.

When magnets are used, removal of the modular payload 114 and the lift generation module 200 only requires that the operator apply a reasonable force to pull or rock a given module from the airframe 102. For example, a plurality of magnets may be mounted on a surface of the airframe 102 (or embedded within the airframe 102) and arranged to mate with corresponding magnets (or metal) positioned at the attachment point (e.g., on an underside surface) of the lift generation module 200, the modular payload 114, or another component. If electromagnets are used, removal of the modular payload 114 and the lift generation module 200 may be achieved by simply disabling the electromagnet(s), whether locally using an electric button/switch or over the network. Other types of retention devices 122 may provide a mechanical release button on the fuselage module 100 (or the lift generation module 200) to disengage the retention devices 122 or require that the operator apply (e.g., simultaneously) a reasonable push/pull force and twisting (torsional) force to detach a given module from the airframe 102.

Avionics and Communications Systems 120.

The avionics and communications systems 120, which can be shared across architecture platforms, may contain the flight control laws for each compatible lift generation module 200 (e.g., stored to a memory device), and has the capability to recognize which type (e.g., fixed-wing, VTOL, propulsor configuration, number/size of propulsors, etc.) of lift generation module 200 is attached via, for example, the above mentioned authentication step. The avionics and communications systems 120 also include one or more communication links (e.g., Line-Of-Sight (LOS) and Beyond Line-Of-Sight (BLOS)) to the ground control station, as well as the capability to transmit high-definition video. In addition, the avionics and communications systems 120 may contain several sensors including a barometric altimeter, inertial measurement unit (IMU), GPS, and a micro-radar for use as a radar altimeter. Additional sensors can be integrated with different lift generation modules 200 systems as appropriate—for example, collision avoidance sensors may be provided on the hovering lift generation modules multirotor VTOL lift generation module 200a or a pitot probe on a fixed-wing lift generation module, such as the long-endurance lift generation module 200b and the high-speed lift generation module 200c. The avionics and communications system 120 may be modular to allow forward compatibility with new sensors and hardware that is rapidly being developed.

Structure.

The structural components of the fuselage module 100 and/or the lift generation module(s) 200, depending on the desired size, may be fabricated from one or more of metal, foam, carbon fiber, or another composite material. For example, small, lightweight modular UAS may employ foam, with larger aircraft employing a composite material, metal, or a combination thereof (e.g., a metal alloy frame, stringers, and longerons and/or a composite material skin). In general, the structure is concentrated on the top and bottom in semi-monocoque structure. The top carries the main flight bending and attachment loads, while the bottom is reinforced to enable belly landings. Stringers and longerons may be used to carry the loads between the top and bottom sections. Depending on the architecture platform configuration, the fuselage module 100 may also incorporate skids or landing gear. For example, the fuselage module 100 may include landing gear when configured as a hovering configuration 300a (such as skids) or a long-endurance configuration 300b, but, when configured as a high-speed configuration 300c, the landing gear may be coupled to the high-speed lift generation module 200c.

Modular Payload 114.

The system features the ability to interface with several different modular payloads 114. The modular payload 114 may employ one or more of the structural and/or communication/power connection interfaces discussed above with regard to the attachment interface 110 and the lift generation modules 200. For example, the modular payload 114 illustrated in FIGS. 1a-1c can be replaced by simply interchanging the nose of the aerial vehicle. Depending on the scale of the vehicle, however, the nose may be permanent with an interchangeable payload bay or assembly positioned within the nose (e.g., accessible via an access panel).

Communications from the flight controller to the modular payload 114 (or other payload) may be the same as the communication techniques used between the flight controller and the lift generation modules 200 (e.g., servo channels, Ethernet, I²C/SPI, and power). Any required voltage conversion can be performed using power conditioning electronics included with the payload. As with the lift generation modules 200, the flight controller will be able to detect the type of payload in use and receive feedback from it if appropriate, thereby allowing for the possibility of tight payload integration, and possibly use of payload sensors for a flight controller.

The payload sensors may include, without limitation, ultrasonic sensors, infrared sensors, radar, LIDAR (light imaging, detection, and ranging), thermal cameras (e.g., FLIR), and the like. To collect data and monitor an area, the modular payload 114 may be equipped with a traditional intelligence, surveillance, and reconnaissance (ISR) payload. For example, the modular payload 114 may be equipped with one or more cameras, audio devices, and other sensors. Any video, image, audio, telemetry, and/or other sensor data collected may be stored locally or communicated wirelessly from the aircraft to a remote location (e.g., a ground control station) in real time using an antenna coupled with an onboard wireless communication device (e.g., via the avionics and communications system 120), such as a transmitter/receiver. Alternatively, such information may be communicated, or otherwise transferred, to the remote location or another party via a wired connection (e.g., if the aircraft is tethered or landed).

Lift Generation Modules 200.

FIG. 1e illustrates the fuselage module 100 with a plurality of different lift generation modules 200, including a multirotor VTOL lift generation module 200a to provide VTOL operation, a long-endurance lift generation module 200b to provide increased flight time, and a high-speed lift generation module 200c to provide high-speed operation. Depending on the configuration, the various lift generation modules 200 provide, for example, lifting surfaces, propulsors, onboard circuitry 218 (e.g., power conditioning electronics), speed controllers (e.g., electronic speed controllers (ESC) 226), flight control actuators, and surfaces/flight control surfaces. The lift generation modules 200 may also include additional systems, such as fixed or retractable landing gear and/or specialized configuration-specific sensors. Flight control inputs to the lift generation modules 200 originate with the main flight control system of the fuselage module 100. While the lift generation modules 200 vary in terms of features and hardware, each includes an attachment interface sized, shaped, and otherwise configured to mate with the attachment interface 110 of the fuselage module 100. As one of skill in the art would appreciate, the fuselage module 100 and the plurality of lift generation modules 200 can be scaled up or down to facilitate a particular purpose or mission.

Hovering Configuration 300a.

Figure 2B:
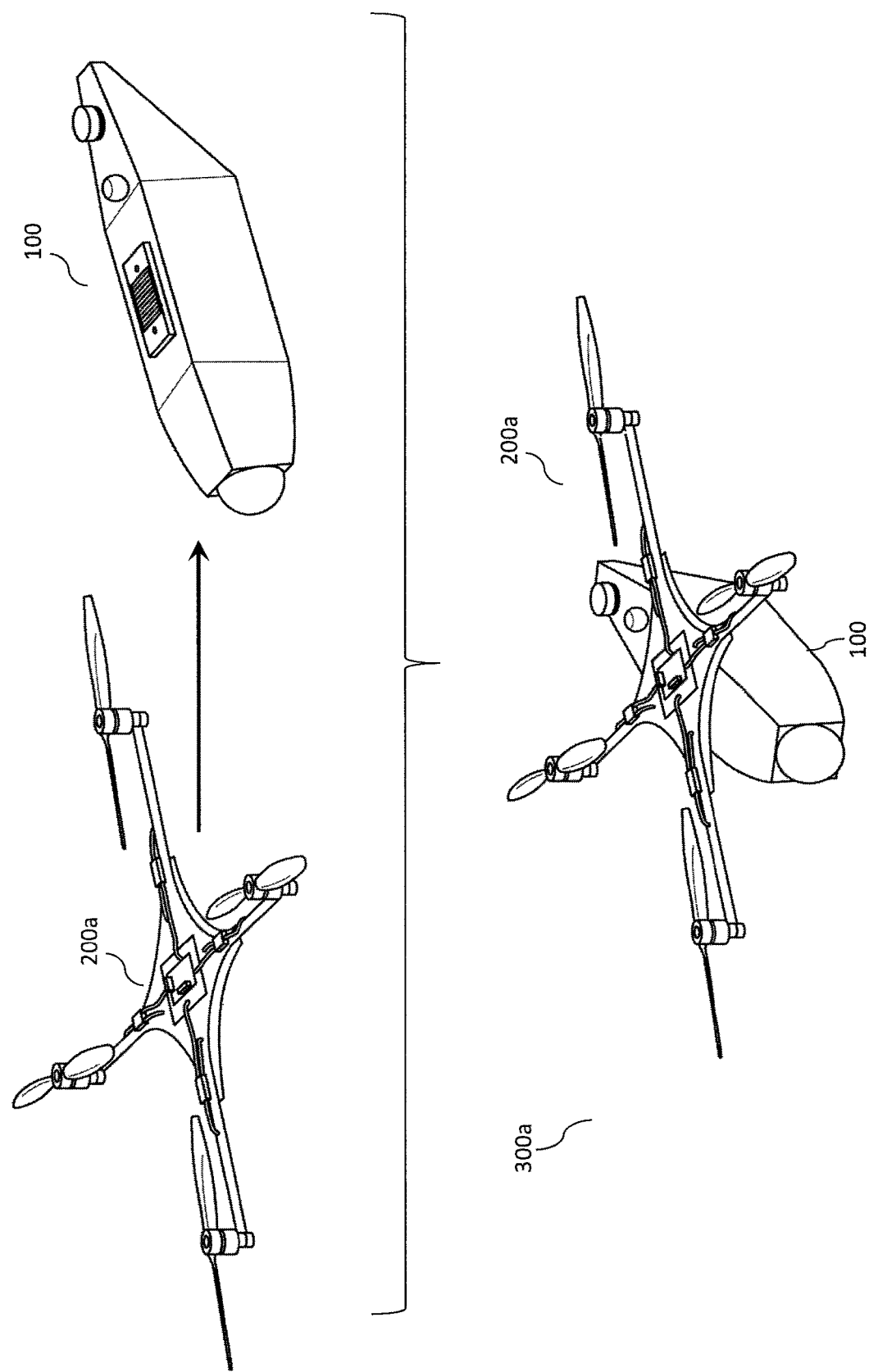
FIG. 2b illustrates an aircraft in a hovering configuration.

FIG. 2a illustrates an example multirotor VTOL lift generation module 200a, while FIG. 2b illustrates the fuselage module 100 configured with the multirotor VTOL lift generation module 200a in a hovering configuration 300a. As illustrated in FIG. 2a, a multirotor VTOL lift generation module 200a generally comprises a support frame 204, a plurality of longitudinal booms 206 extending radially from the support frame 204, a plurality of propulsors 202, and a plurality of ESC 226 to control the speed of the propulsors 202. As illustrated, each propulsor 202 may be coupled to the ESC 226 via a drive-power link 226a (e.g., a cable). The ESC 226, in turn, is coupled (through the attachment interface) to the power unit 116 via one or more input power links 226b and to the flight controller via one or more data links 226c. The ESC 226 may be coupled directly to the power unit 116 via the input power link 226c or through the flight controller. Each of said plurality of propulsors 202 may be placed at a distal end of a longitudinal boom 206 and oriented to direct thrust downward (relative to the vehicle).

While the multirotor VTOL lift generation module 200a is illustrated as having four propulsors 202, a person of skill in the art would recognize that additional, or fewer, propulsors 202 may be employed depending on the aircraft size and weight (e.g., about 1 to 12 propulsors, more preferable about 2 to 8 propulsors, most preferably about 4 to 6 propulsors). The multirotor VTOL lift generation module 200a may also include collision avoidance sensors of various types to enable the aircraft to perform multirotor missions (e.g., close-up inspection, maneuvering through confined areas, aerial photography) with the same flight time and payload limitations provided by traditional multirotor configuration systems.

Long-Endurance Configuration 300b.

Figure 3A:
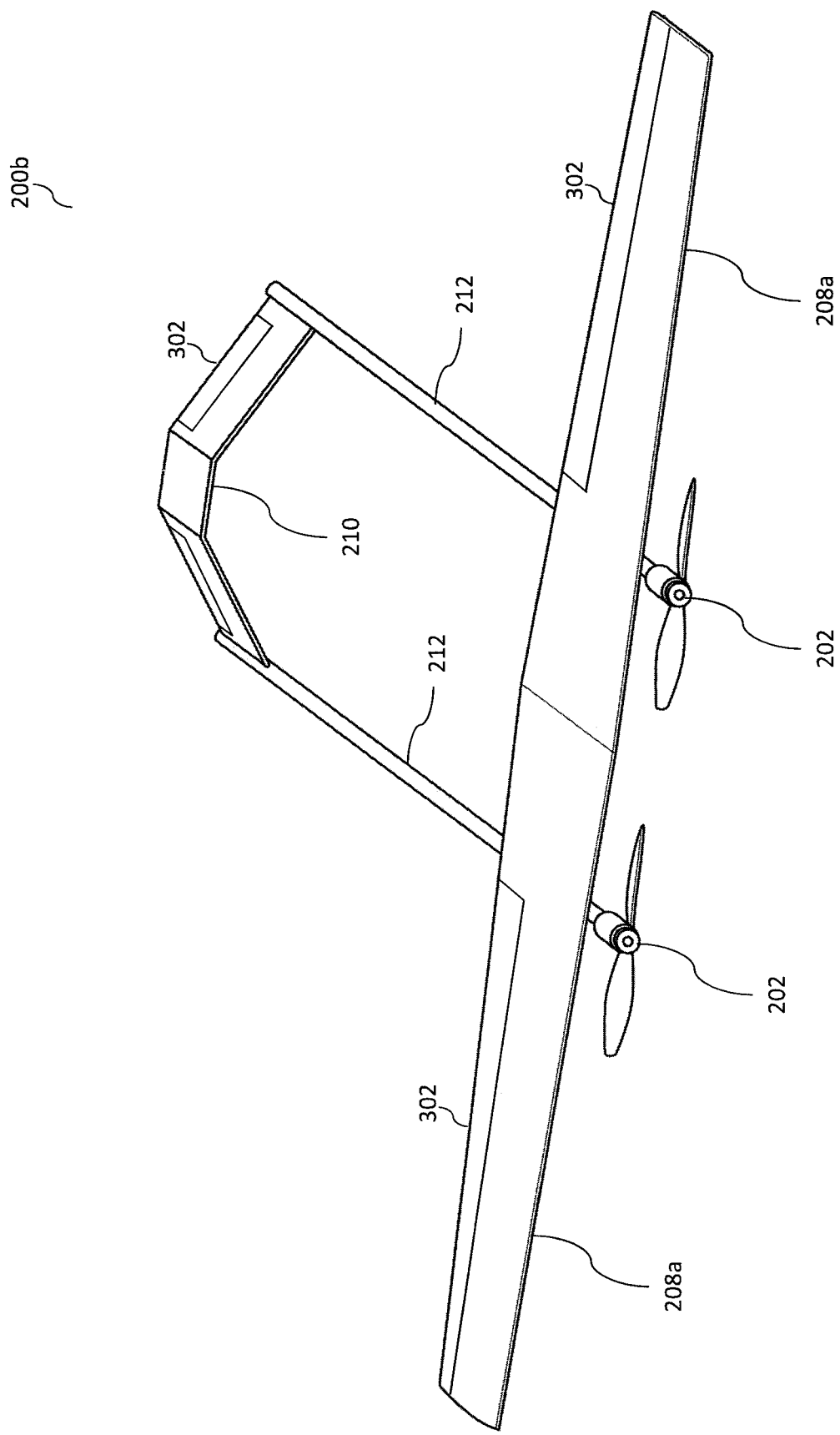
FIG. 3a illustrates a perspective view of a long-endurance lift generation module.

FIG. 3a illustrates an example long-endurance lift generation module 200b, while FIG. 3b illustrates the fuselage module 100 configured with the long-endurance lift generation module 200b in a long-endurance configuration 300b.

As illustrated in FIG. 3a, a long-endurance lift generation module 200a generally comprises two wings 208a (together defining a wing set), a plurality of longitudinal booms 206 extending aft from the wing set, a plurality of propulsors 202 (e.g., as illustrated, a rotor having a motor/engine-driven propeller), a plurality of ESCs 226 (not illustrated) to control the speed of the propulsors 202, and an empennage 210. The ESCs 226 may be, for example, embedded in the airframe (e.g., fuselage portion 228 or wings 208) of the lift generation module 200.

The wings 208a (and empennage 210) may employ one or more control surfaces 302, such as a single conventional aileron configuration or, in the alternative, a plurality of span-wise distributed, independently actuated, ailerons (e.g., wing-borne control surfaces), or flaperons, which is a type of aircraft control surface that combines aspects of both flaps and ailerons. As illustrated, the one or more control surfaces 302 may be positioned at the trailing edge of the wings 208a and/or empennage 210. The flaperon may incorporate one or more types of flaps or flap features, including, without limitation, plain, split, slotted, Fowler, Junkers Flap Gouge, Fairey-Youngman, Zap, Krueger, Gurney, and, in certain aspects, leading edge flaps, such as leading edge droop and blown flaps. A winglet 214 may be provided at the distal end of each wing 208a to, inter alia, improve aircraft handling characteristics, enhance safety, and improve efficiency of the aerial vehicle. The wings 208a may further utilize a continuous set of sensors (e.g., strain/torque measurement sensors) along each wing 208a to manipulate the span-wise, continuous, trailing edge surface (e.g., the flaperons), much in the way a bird is known to alter its wing shape.

In certain aspects, an aircraft in the long-endurance configuration 300b is hand launched and belly lands, although landing gear 216 may be included. A pitot probe may be included on the wings 208a to feed data back to the flight control system. The wings 208a, longitudinal booms 212, and empennage 210 can be disassembled for easy transport. While the long-endurance lift generation module 200b is illustrated as having two propulsors 202, a person of skill in the art would recognize that additional, or fewer, propulsors 202 may be employed depending on the aircraft size and weight.

High-Speed Configuration 300c.

Figure 4A:
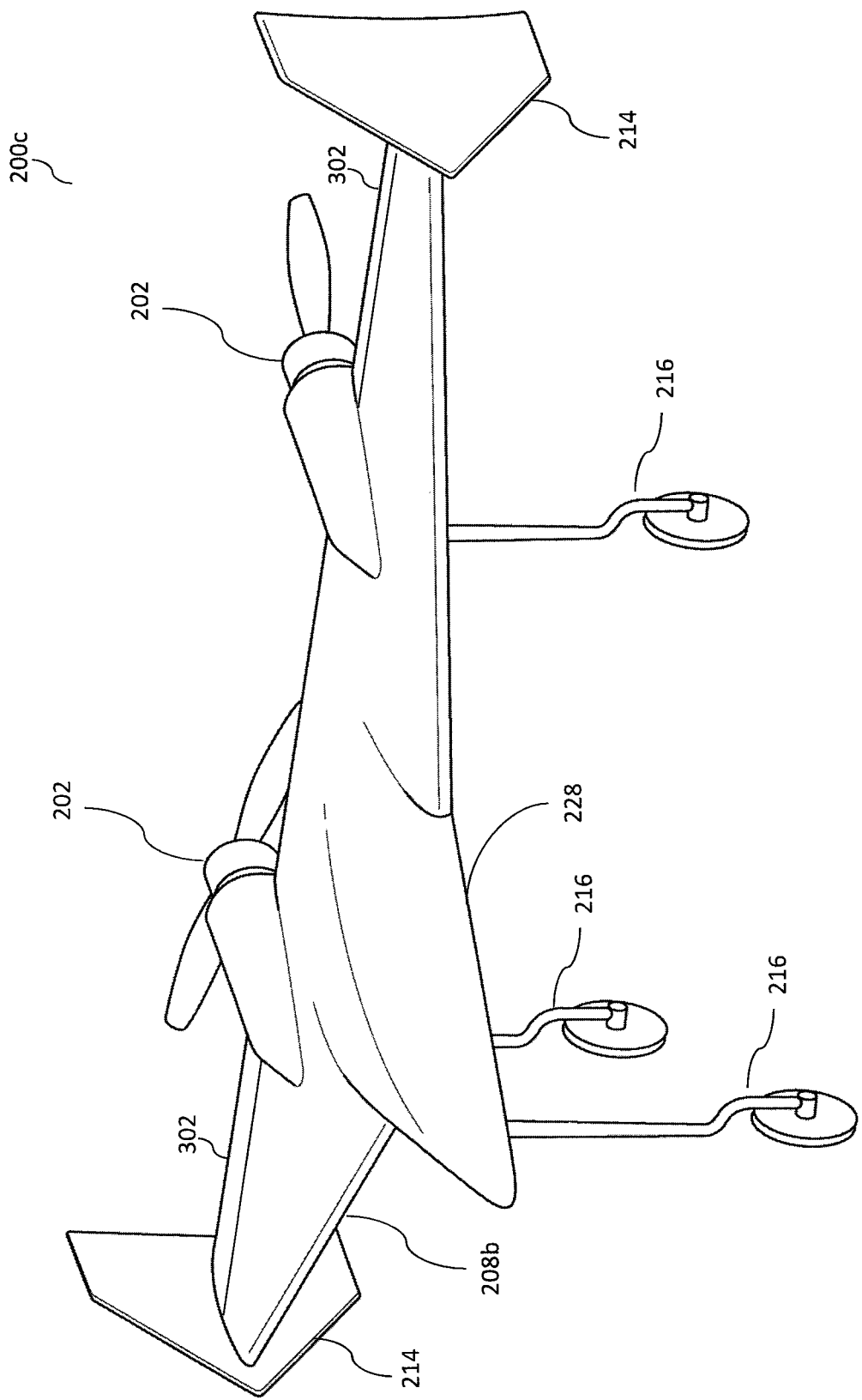
FIG. 4a illustrates a perspective view of a high-speed lift generation module.
Figure 4B:
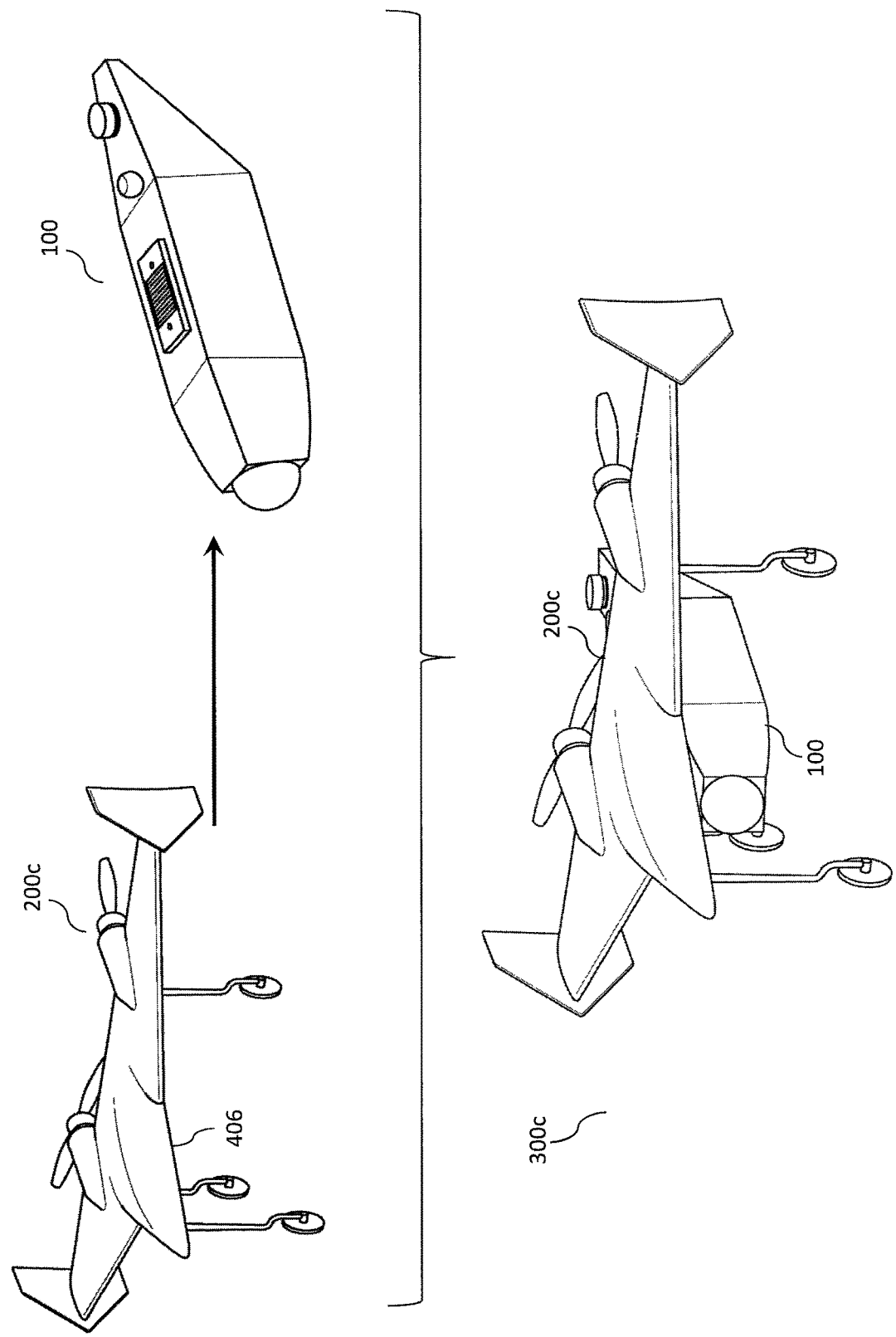
FIG. 4b illustrates an aircraft in a high-speed configuration.

FIG. 4a illustrates an example high-speed lift generation module 200c, while FIG. 4b illustrates the fuselage module 100 configured with the high-speed lift generation module 200c in a high-speed configuration 300c. The high-speed configuration may be desirable when maximum speed is needed instead of flight time—for example, conducting rapid assessment operations or delivering critical supplies.

As illustrated in FIG. 4a, a high-speed lift generation module 200c may employ a flying wing design generally comprising a fuselage portion 228, two wings 208b (together defining a wing set), and winglets 214. Akin to the long-endurance lift generation module 200a, the wings 208b may employ one or more control surfaces. While not illustrated, an empennage may be situated at the aft end of the high-speed lift generation module 200c. The high-speed lift generation module 200c also includes a plurality of propulsors 202 coupled to, for example, the wings 208b and/or fuselage portion 228. The propulsors 202 may be arranged in a tractor configuration or, as illustrated, a pusher configuration. Due to higher wing loading, the high-speed lift generation module 200c may employ landing gear 216, which may be fixed or retractable. While the high-speed lift generation module 200c is illustrated as having two propulsors 202, a person of skill in the art would recognize that additional, or fewer, propulsors 202 may be employed depending on the aircraft size and weight.

The preceding three configurations are meant to be illustrative and not an exhaustive list. For configurations providing hybrid fixed-wing/VTOL capability are contemplated, including but not limited to tilt-wings and tilt-rotors, as well as additional multicopter/fixed-wing options. The modular UAS concept can also be extended to the creation of larger vehicle on demand—for example, two fuselages modules 100 may be joined to a single wing to enable heavier lift/longer-endurance capacity, although adjustments to the flight control systems would be needed. To provide heavy lift capability, additional payload and/or power could be built into some lift generation module 200 configurations, which are still controlled by the common flight control system.

Akin to the modular payload 114 and the lift generation modules 200, when an empennage is employed on the aircraft, the empennage may be modular and removably coupled to the fuselage module 100 and/or lift generation module 200. By way of examples, different types of empennage tail configurations include, for example, V-Tail, inverted V-Tail, H-Tail, etc.

Figure 5:
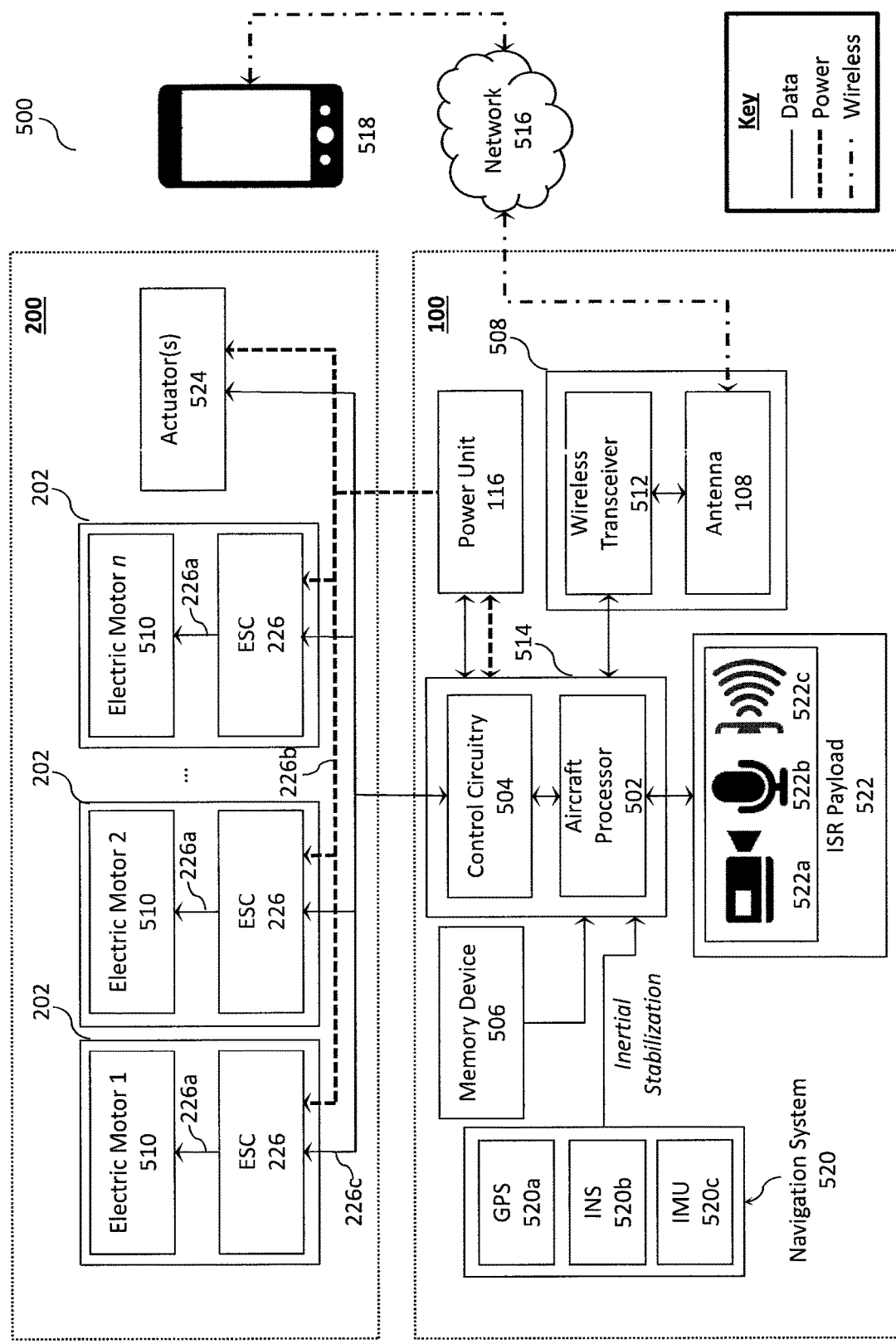
FIG. 5 illustrates a block diagram of an example aircraft control system.

FIG. 5 illustrates a block diagram of an example aircraft control system 500 for the above-described aircraft and aerial systems (e.g., fuselage module 100 configured with a lift generation module 200 in a hovering configuration 300a, a long-endurance configuration 300b, a high-speed configuration 300c, etc.). The aircraft control system 500 can be configured to control the various aircraft components and functions of the aircraft. As illustrated, the aircraft control system 500 includes one or more flight controllers 514 (e.g., an aircraft processor 502 and associated control circuitry 504) communicatively coupled with at least one memory device 506, a communications system 508 (e.g., a wireless transceiver 512 and antenna 108), and a navigation system 520. The aircraft processor 502 may be configured to perform one or more operations based at least in part on instructions (e.g., software, firmware, etc.) and/or one or more databases stored to the memory device 506 (e.g., a hard drive, flash memory, or the like). In certain aspects, the at least one memory device 506 may be integral with the flight controller 514. The one or more flight controllers 514 may also be operatively coupled with the power unit 116 and an ISR payload 522. The power unit 116 may provide the power to needed operate the various components of the aircraft control system 500, through some power connection lines may not be illustrated in FIG. 5. For example, the power unit 116 may provide both power and data (e.g., status data) to the aircraft controller 514. The status data (e.g., battery voltage, amperage, fuel level, temperature, etc.) may be used by the aircraft controller 514 to determine the power unit's 116 remaining capacity and/or, in the case of battery-powered systems, the state-of-charge or state-of-heath of the battery.

The aerial system or aircraft control system 500 may further include other desired services, such as a communications system 508 (e.g., wireless transceiver 512 coupled with an antenna 108) to communicate data between the aircraft (e.g., the flight controller 514) and a remote device 518 (e.g., portable electronic devices, such as smartphones, tablets, and laptop computers) or other remotely-situated controller (e.g., a base station). For example, the aircraft may communicate data (processed data, unprocessed data, etc.) with the remote device 518 over a network 516. In certain aspects, the wireless transceiver 512 may be configured to communicate using one or more wireless standards such as Bluetooth (e.g., short-wavelength, Ultra-High Frequency (UHF) radio waves in the Industrial, Scientific, and Medical (ISM) band from 2.4 to 2.485 GHz), near-field communication (NFC), Wi-Fi (e.g., Institute of Electrical and Electronics Engineers' (IEEE) 802.11 standards), etc. The remote device 518 may facilitate monitoring and/or control of the aircraft and its payload(s), including the ISR payload 522.

With reference to the flight controller 514, the aircraft processor 502 may be operatively coupled to the control circuitry 504 to control operation of the various actuators 524 (e.g., those to control movement of flight surfaces), propulsors 202 (e.g., a propeller driven by an electric motor 510 coupled to an ESC 226) in response to commands from an operator, autopilot, a navigation system 520, or other high-level system via the wireless transceiver 512. In certain aspects, the aircraft processor 502 and the control circuitry 504 may be integrated to provide the flight controller 514 as a single component (e.g., a single printed circuit board (PCB)) or circuit. In operation, the flight controller 514 may dynamically (i.e., in real-time or near real-time) and independently adjust thrust from each of the electric motors 510 during the various stages of flight (e.g., take-off, cruising, landing) via the ESC 226 to control roll, pitch, or yaw of the aircraft 300. In other words, the flight controller 514 can independently control each of the electric motors 510 to generate a desired lift thrust for each of the electric motors 510, whether directly of via an ESC 226.

While generally illustrated as positioned on the lift generation module 200, the ESCs 226 be located in (or on) either the fuselage module 100 or the lift generation module(s) 200. Therefore, the flight controller 514 can be operatively coupled with the power unit 116 directly or via an ESC 226. When rotors with rotor blades (e.g., propellers) are used, the flight controller 514 may vary the revolutions per minute (RPM) of the rotor and/or, where desired, vary the pitch of the rotor blades. Specifically, the electric motors 510 may be controlled by adjusting power supplied to each electric motor from a power unit 116 (e.g., a battery pack, a battery bank, hybrid-electric power system, etc.) via the ESC 226.

The aircraft processor 502 may be operatively coupled to the navigation system 520, which may include a global positioning system (GPS) 520a that is communicatively coupled with an Inertial Navigation System (INS) 520b and/or an inertial measurement unit (IMU) 520c, which can include one or more gyros and accelerometers. The GPS 520a gives an absolute drift-free position value that can be used to reset the INS solution or can be blended with it by use of a mathematical algorithm, such as a Kalman Filter. The navigation system 520 may communicate, inter alia, inertial stabilization data to the aircraft processor 502.

To collect data and/or monitor an area, the aircraft or aircraft control system 500 may further be equipped with an intelligence, surveillance, and reconnaissance (ISR) payload 522 comprising, for example, one or more cameras 522a (e.g., payload camera 104, or another an optical instrument for recording or capturing images and/or video, including light detection and ranging (LIDAR) devices), audio devices 522b (e.g., microphones, echolocation sensors, etc.), and other sensors 522c to facilitated ISR functionality and provide ISR data (e.g. photographs, video, audio, sensor measurements, etc.). The ISR payload 522 is operatively coupled to the aircraft processor 502 to facilitate communication of the ISR data between the ISR payload 522 and the aircraft processor 502. The ISR data may be used to navigate the aircraft. The ISR payload 522 may be rotatably and pivotally coupled to, for example, the underside surface of the airframe 102 (or another structural component, such as the longitudinal booms 206, 212) via a gimbal system to enable the ISR payload 522 to be more easily oriented downward to monitor objects below and/or on the ground. For example, as illustrated in FIG. 1a, a sensor payload may be positioned at the forward end of the fuselage module 100 as part of the modular payload 114. The data may be dynamically or periodically communicated from the aircraft (e.g., the aircraft control system 500 to the remote device 518 over the network 516 via the wireless transceiver 512, or stored to the memory device 506 for later access or processing.

Performance Evaluation.

With reference to FIGS. 6 and 7, a performance assessment was conducted for several example configurations to assess the advantages of the modular UAS. The assessment was focused around an initial vehicle in the 20-pound weight class. A larger vehicle with a hybrid-electric power system, in the 30 to 40 pound range, was also investigated. In all cases, 5 pounds of on-board payload was assumed. A common fuselage module 100 was sized based on an existing power generation system (hybrid electric or batteries) and known weight fractions/sub-system weights. Lift generation module 200 system weights were computed based on weight fractions of existing aerial vehicles and known subsystem weights. The performance of the systems was then assessed using existing analysis methods.

The vehicle performance shown in FIG. 6 is based on propulsion system weights and performance developed for a hybrid-electric multi-copter program. Energy generation can refer to either battery or a hybrid-electric system. The endurance numbers for both variants are shown. Hybrid-electric systems offer the potential for vastly increased system performance, at the expense of higher cost and increased logistical and system complexity. That makes this architecture especially attractive for hybrid-electric systems, as those systems will have high re-use across a variety of missions.

FIG. 7 shows the performance estimates for a smaller variant, sized around the fixed-wing 20 propulsion system and payload. This is an electric-only system, and comprises a third, high-speed variant as well as a long-endurance and hovering configurations. This shows similar performance to the all-electric systems in FIG. 6. In this case, the main benefit of going to the larger aerial vehicles is that they would enable the use of hybrid-electric systems. As will be appreciated those of skill in the art, the presently disclosed concept can be sized up and down for virtually any desired payload or mission capability.

The subject modular UAS may be applied across a variety of markets that use sUAS systems, as most consumers of sUAS systems desire different capability at different times. For example, first responders in disaster relief efforts may need to map quickly an effected area, set up a persistent surveillance capability, and do closer inspections of areas of interest in addition to delivering high-value medical supplies. However, doing all of that with one vehicle enforces an excessive number of tradeoffs on the vehicle design, or it means doing everything with multi-rotors, which can be logistically limiting. Long-endurance variants can be deployed to provide persistent surveillance from open areas, while the high-speed aerial vehicles could be launched from a road to provide mapping and rapid delivery capability. Multi-rotor variants would be used for those tasks which best fit their capability—precision delivery, inspection, and maneuvering through combined areas. Police, fire fighters, surveyors, and newscasters face a need for a similar diversity of capabilities. Many events take place over more than 20 or 30 minutes (the flight time of a typical multi-rotor system), where it is not always feasible or desirable to use a fixed-wing vehicle. Accordingly, many consumers of sUAS systems need different capabilities at different times, but operating many different families of aerial vehicles is expensive and hampered by non-common command and control and data systems. The modular UAS concept disclosed herein provides a diverse range of capabilities in an integrated system.

The above-cited patents and patent publications are hereby incorporated by reference in their entirety. Although various embodiments have been described with reference to a particular arrangement of parts, features, and like, these are not intended to exhaust all possible arrangements or features, and indeed many other embodiments, modifications, and variations will be ascertainable to those of skill in the art. Thus, it is to be understood that the teachings of the present disclosure may therefore be practiced otherwise than as specifically described above.

What is claimed is:

1. An aerial vehicle fuselage comprising:
a flight controller operatively coupled with a power unit; and
a communications system operatively coupled with the flight controller,
wherein the aerial vehicle fuselage is configured to removably couple with one of a plurality of lift generation modules at an attachment point of the aerial vehicle fuselage via an attachment interface,
wherein a plurality of electrical contacts are located at the attachment point to facilitate electrical communication between the flight controller and the one of a plurality of lift generation modules, and
wherein at least one of the flight controller or the communications system is configured to authenticate said plurality of lift generation modules by communicating via one or more of the plurality of electrical contacts.

2. The aerial vehicle fuselage of claim 1, wherein the power unit, the flight controller, and the communications system are positioned in an airframe to define a fuselage module, wherein the attachment interface is coupled to the airframe and is configured to couple structurally with a second attachment interface of the one of a plurality of lift generation modules via one or more retention devices.

3. The aerial vehicle fuselage of claim 2, wherein the one or more retention devices includes an electromagnetic connector.

4. The aerial vehicle fuselage of claim 1, wherein said plurality of lift generation modules includes a multirotor vertical takeoff and landing (VTOL) lift generation module and a fixed-wing lift generation module.

5. The aerial vehicle fuselage of claim 1, wherein the flight controller is configured to couple electrically said power unit to said one of said plurality of lift generation modules via one or more of the plurality of electrical contacts.

6. The aerial vehicle fuselage of claim 1, wherein at least one of the flight controller or the communications system is configured to notify an operator if the flight controller or the communications system cannot authenticate said plurality of lift generation modules.

7. The aerial vehicle fuselage of claim 1, wherein the power unit is a hybrid-electric system configured to generate electricity via an engine-driven generator.

8. An aerial vehicle system comprising:
a fuselage module comprising a first attachment interface, a flight controller operatively coupled with a power unit, and a communications system operatively coupled with the flight controller; and
a lift generation module comprising a second attachment interface and a plurality of propulsors,
wherein the fuselage module is configured to removably couple with the lift generation module via the first and second attachment interfaces,
wherein the first and second attachment interfaces comprise (1) a plurality of electrical contacts to facilitate electrical communication between the fuselage module and the lift generation module and (2) one or more retention devices to couple structurally the lift generation module with said fuselage module,
wherein the fuselage module is configured to employ a predetermined flight operation plan as a function of the lift generation module.

9. The aerial vehicle system of claim 8, wherein each of said plurality of propulsors is operatively coupled to an electronic speed controller (ESC) configured to control propulsor speed.

10. The aerial vehicle system of claim 8, wherein the lift generation module is a fixed-wing lift generation module comprising at least one fixed wing.

11. The aerial vehicle system of claim 8, wherein the lift generation module is a multirotor vertical takeoff and landing (VTOL) lift generation module.

12. The aerial vehicle system of claim 8, wherein the one or more retention devices includes a electromagnetic connector.

13. The aerial vehicle system of claim 8, wherein the flight controller is configured to couple electrically said power unit to the lift generation module via one or more of the plurality of electrical contacts.

14. The aerial vehicle system of claim 8, wherein at least one of the flight controller or the communications system is configured to communicate data with the lift generation module via one or more of the plurality of electrical contacts.

15. A method for improving an operational capability of an aerial vehicle system, the method comprising:
providing a fuselage module comprising a first attachment interface, a flight controller operatively coupled with a power unit, and a communications system operatively coupled with the flight controller; and
providing a lift generation module comprising a second attachment interface and a plurality of propulsors,
wherein the fuselage module is configured to removably couple with the lift generation module via the first and second attachment interfaces,
wherein the first and second attachment interfaces comprise (1) a plurality of electrical contacts to facilitate electrical communication between the fuselage module and the lift generation module and (2) one or more retention devices to couple structurally the lift generation module with said second attachment interface,
wherein the fuselage module is configured to receive service history information from the lift generation module.

16. The method of claim 15, further comprising the step of removably coupling the lift generation module to the fuselage module.

17. The method of claim 15, wherein the fuselage module is configured to authenticate the lift generation module to ensure compatibility or interoperability with the fuselage module.

18. The method of claim 17, wherein the fuselage module is configured to authenticate the one of the plurality of lift generation modules using radio-frequency identification (RFID).

19. The method of claim 18, wherein the fuselage module comprises an RFID reader and the lift generation module comprises an RFID tag.

20. The method of claim 19, wherein the fuselage module processes information from the RFID tag in determining whether or not to authenticate the lift generation module.

\* \* \* \* \*